US011650085B2

(12) United States Patent
Datta Gupta et al.

(10) Patent No.: US 11,650,085 B2
(45) Date of Patent: May 16, 2023

(54) METHODS AND APPARATUS TO FACILITATE ACTIVE PROTECTION OF PERIPHERAL SENSORS

(71) Applicant: Ford Global Technologies, LLC, Dearborn, MI (US)

(72) Inventors: Somak Datta Gupta, Novi, MI (US); Mahmoud Yousef Ghannam, Canton, MI (US); Swadad A. Carremm, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 347 days.

(21) Appl. No.: 17/103,707

(22) Filed: Nov. 24, 2020

(65) Prior Publication Data

US 2021/0080296 A1 Mar. 18, 2021

Related U.S. Application Data

(62) Division of application No. 16/105,721, filed on Aug. 20, 2018, now Pat. No. 10,955,268.

(51) Int. Cl.

*G01D 11/02* (2006.01)
*G07C 5/08* (2006.01)
*G01D 11/24* (2006.01)
*G05D 1/02* (2020.01)

(52) U.S. Cl.

CPC ........... *G01D 11/02* (2013.01); *G01D 11/245* (2013.01); *G07C 5/0808* (2013.01); *G05D 1/0231* (2013.01); *G05D 1/0257* (2013.01); *G05D 2201/0213* (2013.01)

(58) Field of Classification Search

CPC ..... G01D 11/02; G01D 11/245; G05D 1/0257
See application file for complete search history.

(56) References Cited

U.S. PATENT DOCUMENTS 8,910,986 B1 * 12/2014 Appukutty ............ B60R 19/483 296/187.03
2018/0188079 A1 * 7/2018 Ko ..................... G01D 5/34707

FOREIGN PATENT DOCUMENTS

| | | | | | |
|---|---|---|---|---|---|
| CN | 104677602 | A | * | 6/2015 | |
| DE | 102014010495 | B3 | * | 12/2015 | B60R 1/00 |
| DE | 102017214994 | A1 | * | 2/2019 | B60R 11/04 |
| DE | 102019112504 | A1 | * | 12/2019 | B60R 16/0232 |
| KR | 20050006750 | A | * | 1/2005 | |

* cited by examiner

*Primary Examiner* — Jamel E Williams
(74) *Attorney, Agent, or Firm* — Frank Lollo; Eversheds Sutherland (US) LLP

(57) ABSTRACT

Method and apparatus are disclosed for facilitating active protection of peripheral sensors. An example vehicle includes a sensor and a sensor protector. The example sensor protector is configured to, responsive to a vehicle collision, obtain diagnostic information from the sensor. The example sensor protector is also configured to determine whether to move the sensor from a first position to a second position based on the diagnostic information. The example sensor protector is also configured to cause the sensor to from the first position to the second position based on the determination.

5 Claims, 8 Drawing Sheets

METHODS AND APPARATUS TO FACILITATE ACTIVE PROTECTION OF PERIPHERAL SENSORS

CROSS-REFERENCE TO RELATED APPLICATIONS

The present disclosure claims priority to, the benefit of, and is a divisional of U.S. application Ser. No. 16/105,721, filed Aug. 20, 2018, which is hereby incorporated by reference herein in its entirety.

TECHNICAL FIELD

The present disclosure generally relates to vehicle sensors and, more specifically, to methods and apparatus to facilitate active protection of peripheral sensors.

BACKGROUND

Vehicles, especially autonomous vehicles, are equipped with a plurality of sensors, such as radars, cameras, LiDAR, etc. These sensors play a vital role in providing driver assistance and safety features. The unavailability of any one of the sensors can degrade features of the vehicle. In the case of autonomous vehicles, the equipped sensors may be crucial to the functioning of the autonomous vehicle and the unavailability of any one of the sensors may stop the autonomous vehicle from functioning.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for facilitating active protection of peripheral sensors. An example disclosed vehicle includes a sensor and a sensor protector. The example sensor protector is configured to, responsive to a vehicle collision, obtain diagnostic information from the sensor. The example sensor protector is also configured to determine whether to move the sensor from a first position to a second position based on the diagnostic information. The example sensor protector is also configured to cause the sensor to from the first position to the second position based on the determination.

An example disclosed method includes detecting, via a processor of a vehicle, that a collision associated with the vehicle occurred, and responsive to the vehicle collision, obtaining, via the processor, diagnostic information from a sensor. The example method also includes determining, via the processor, whether to move the sensor from a first position to a second position based on the diagnostic information, and causing the sensor to move from the first position to the second position based on the determination An example disclosed apparatus includes a housing including a front upper bracket, a front lower bracket, and a groove. The example apparatus also includes a sensor mounted to the housing and positioned between the front upper bracket and the front lower bracket, and wherein the housing and the sensor rotate along the groove of the housing.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
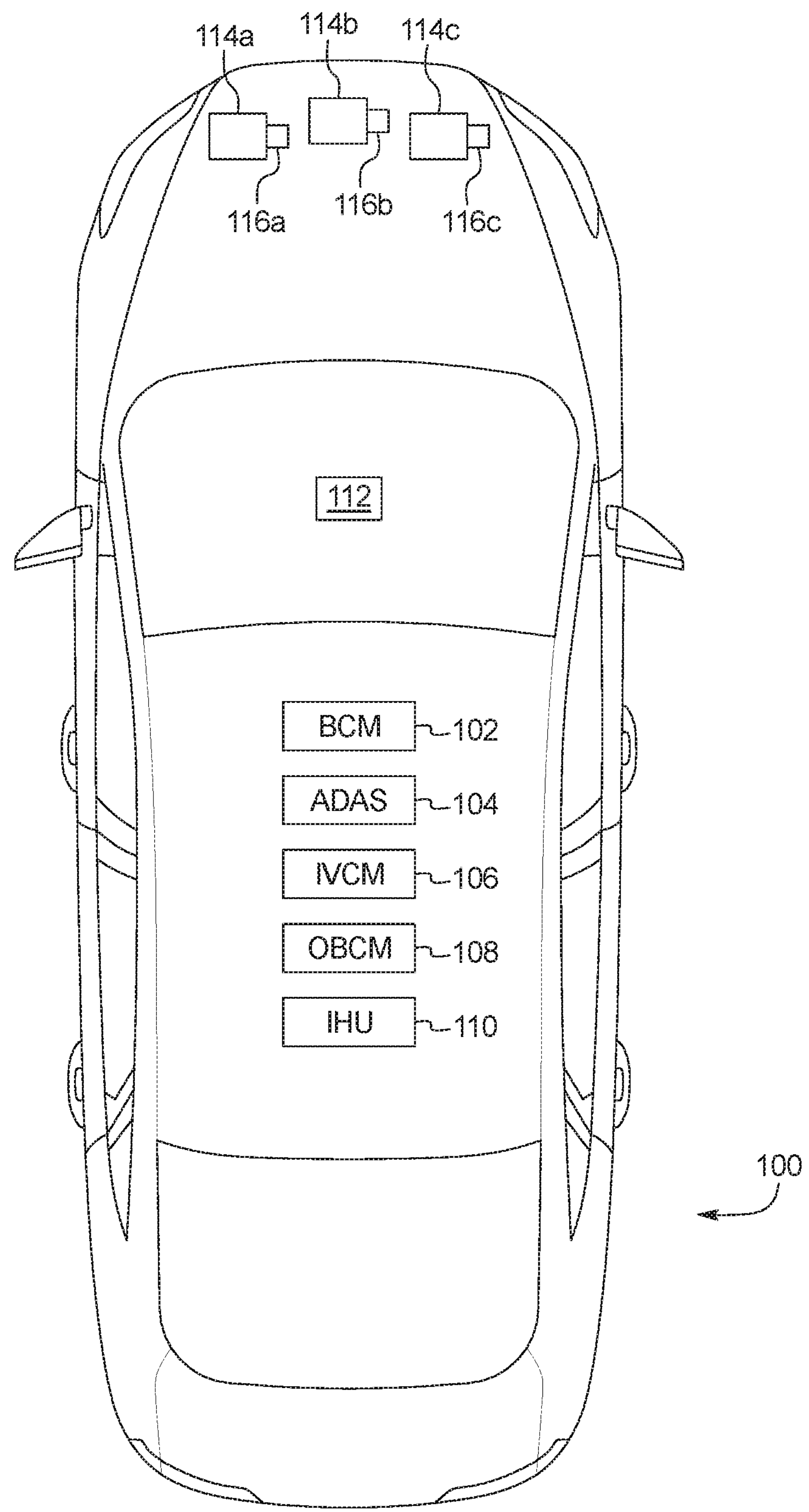
FIG. 1 illustrates an example vehicle in accordance with the teachings herein.
Figure 2:
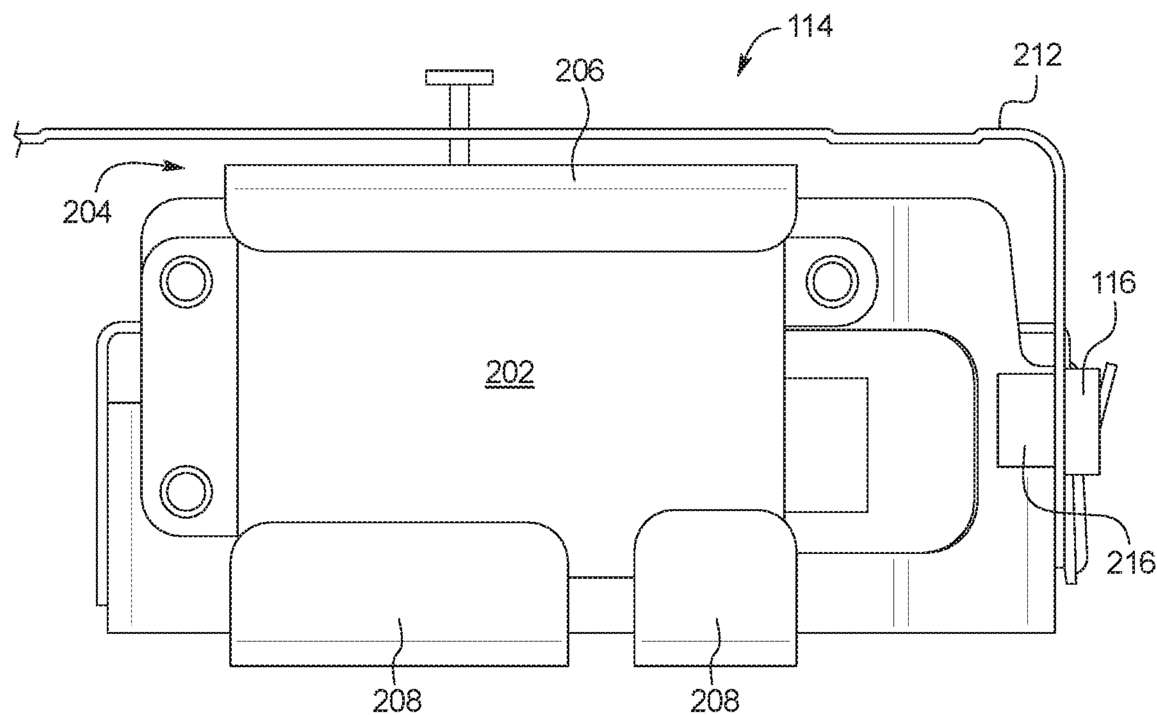
FIG. 2 is an enlarged fragmentary front view of an example active protection sensor of the vehicle of FIG. 1.
Figure 3:
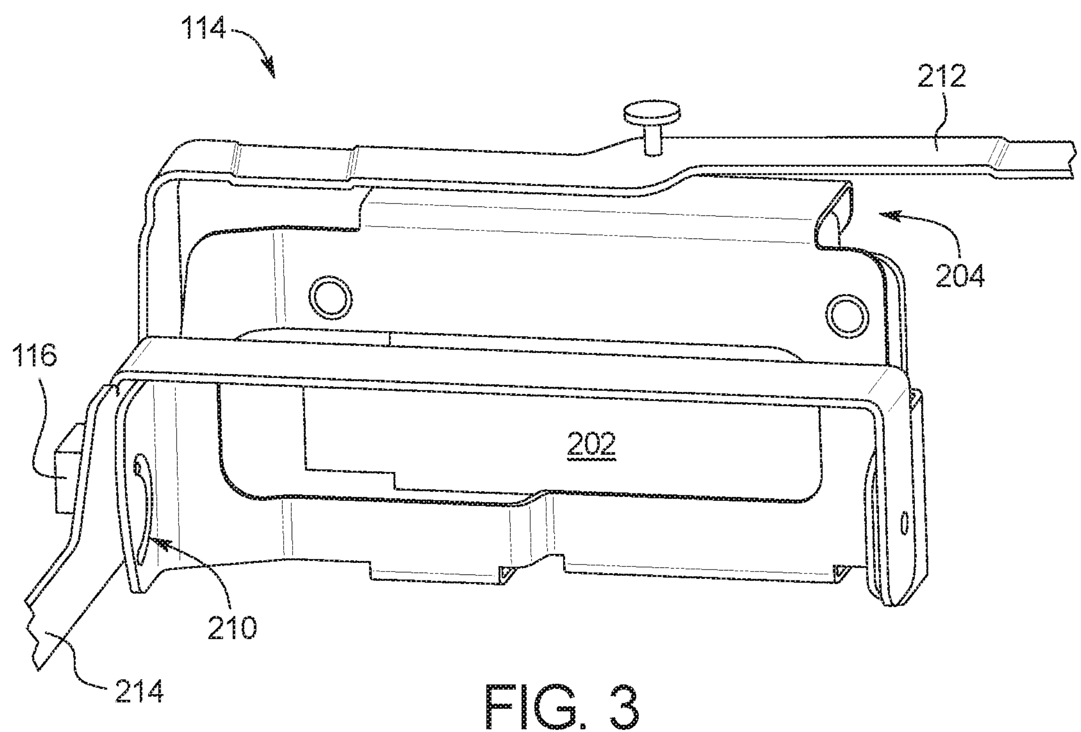
FIG. 3 is an enlarged fragmentary back view of the example active protection sensor of FIG. 2.
Figure 4:
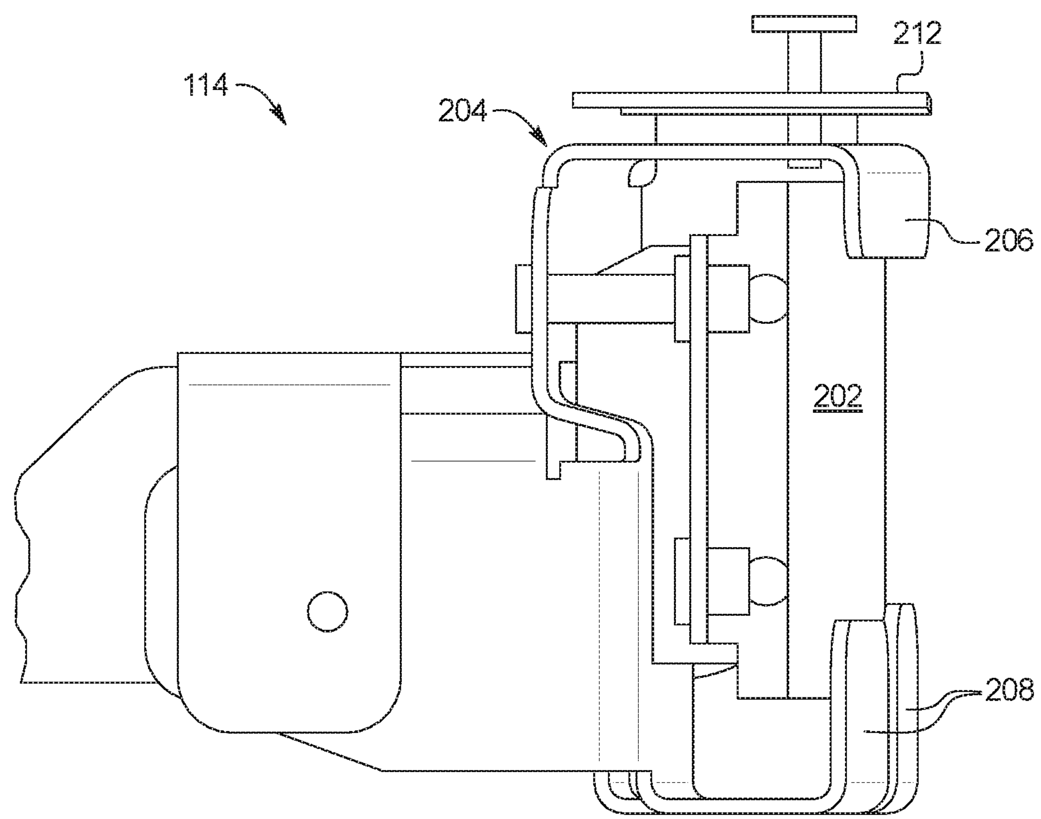
FIG. 4 is an enlarged fragmentary side view of the example active protection sensor of FIG. 2.
Figure 5:
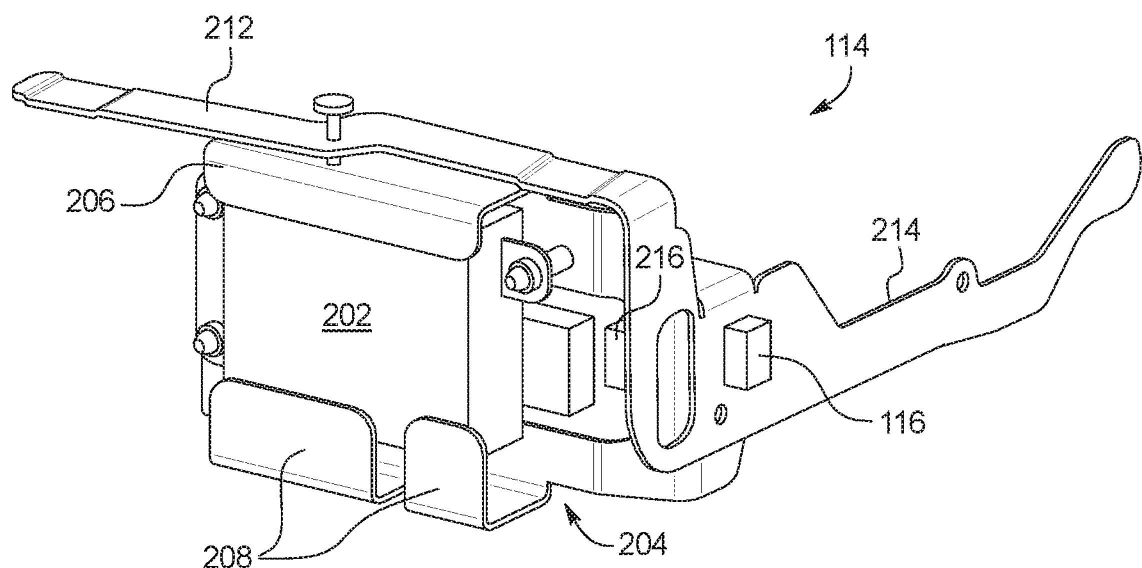
FIG. 5 is an enlarged fragmentary front perspective view of the active protection sensor of FIG. 2.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles, especially autonomous vehicles, are equipped with a plurality of sensors, such as radars, cameras, LiDAR, etc. These sensors play a vital role in providing driver assistance and safety features. The unavailability of any one of the sensors can degrade features of the vehicle. In the case of autonomous vehicles, the equipped sensors may be crucial to the functioning of the autonomous vehicle and the unavailability of any one of the sensors may stop the autonomous vehicle from functioning.

Examples disclosed herein include a vehicle system to facilitate active protection of peripheral sensors of the vehicle. The vehicle system monitors the vehicle for an impending collision, and, in response to detecting an impending collision, determines portion(s) of the vehicle that may be impacted by the impending collision. The vehicle system then activates (or triggers an activation of) a sensor protection mechanism for the peripheral sensor(s) positioned in the determined portion(s) of the vehicle. In some examples, the vehicle system activates the sensor protection mechanism for the peripheral sensor(s) by triggering an actuator to retract the peripheral sensor(s) away from the periphery of the vehicle. In some examples, the vehicle system activates the sensor protection mechanism for the peripheral sensor(s) by triggering an actuator to rotate (or swivel) the peripheral sensor(s) to change the position of the peripheral sensor relative to the expected position of impact. In some examples, the vehicle system continues monitoring the vehicle to determine whether the detected collision occurred and if no collision occurred (e.g., within an expected time interval, or if the expected path of travel changes, etc.), the vehicle system returns the peripheral sensor(s) to their original position (e.g., at or near the periphery of the vehicle).

However, it may not always be possible to detect an impending collision. In some such instances, the vehicle system may be unable to activate the sensor protection mechanism prior to a collision. To further protect the peripheral sensors, the vehicle includes active protection housing in which the peripheral sensors may be mounted. The active protection housing enables additional degrees of freedom for the peripheral sensor during impact. For example, the force of impact may cause a physical activation of the active protection mechanism of the peripheral sensors, resulting in the peripheral sensor being retracted from the periphery of the vehicle and/or rotated away from the location of impact.

Once a collision occurs (either previously detected and resulting in a triggered activation of the sensor protection mechanism or not detected and resulting in a physical activation of the sensor protection mechanism), examples disclosed herein include the vehicle system to perform post-impact diagnostics of the peripheral sensors of the vehicle. For example, the vehicle system may request diagnostic information from the peripheral sensors. In some examples, the vehicle system determines whether the sensor protection mechanism was triggered (e.g., the collision was detected as an impending collision). In some such examples, if the vehicle system determines that the sensor protection mechanism was triggered, the vehicle system determines whether the peripheral sensor can be returned to its original position (e.g., at or near the periphery of the vehicle) and returns the peripheral sensor to its original position, if appropriate. In some examples, the vehicle system determines whether the peripheral sensor moved (e.g., relative to its original position at or near the periphery of the vehicle). In some such examples, if the vehicle system determines that the peripheral sensor moved, the vehicle system determines whether the peripheral sensor can be returned to its original position (e.g., at or near the periphery of the vehicle) and returns the peripheral sensor to its original position, if appropriate. In some examples, if the vehicle system determines that the peripheral sensor cannot be returned to its original position, the vehicle system keeps the peripheral sensor in its sensor protection mechanism activated position until a proper inspection of the sensor is performed.

By triggering the sensor protection mechanism for the peripheral sensors of the vehicle, the vehicle system increases safety by reducing the likelihood of the user being stranded or traveling at-risk due to a peripheral sensor being disabled. Activating the sensor protection mechanisms may also reduce the cost of repair of the vehicle after an accident. The vehicle system may also facilitate reducing costs associated with driving a vehicle, such as insurance costs. Furthermore, by performing post-impact diagnostics, the vehicle system is able to confirm that the peripheral sensors are able to be returned to their original positions and are properly functioning (e.g., as designed and calibrated).

As used herein, "peripheral sensors" are sensors that are positioned at or near the periphery of the vehicle. Peripheral sensors may have an increased likelihood of incurring damage during a collision. For example, a sensor that is positioned in a bumper of the vehicle well may have an increased likelihood of being damaged during a collision with another vehicle and/or an object.

As used herein, a "triggered activation" is an activation of the sensor protection mechanism that is caused (or triggered) by the vehicle system. For example, the vehicle system may detect an impending collision and trigger an activation of the sensor protection mechanism for one or more of the peripheral sensors of the vehicle.

As used herein, a "physical activation" is an activation of the sensor protection mechanism that is caused due to the impact of a collision. For example, the force of impact may cause the sensor protection mechanism to activate for one or more of the peripheral sensors of the vehicle.

As used herein, a "non-activated position" of a peripheral sensor (sometimes referred to herein as an "original position") is the calibrated position of the peripheral sensor. For example, before the vehicle leaves the factory, a calibrated position (e.g., a 2D-coordinate or 3D-coordinate) of each of the peripheral sensors is determined (or measured) with respect to the periphery of the vehicle and/or with respect to another component of the vehicle. The calibrated positions are stored by the vehicle system and used as reference positions, for example, when determining whether the peripheral sensor moved.

As used herein, an "activated position" of a peripheral sensor (sometimes referred to herein as a "safe position") is the position that the peripheral sensor moves to in response to either a triggered activation or a physical activation. For example, in a low intensity crash scenario (e.g., when the vehicle is traveling less than 15 miles per hour, a collision at a stop sign or traffic light, etc.), the activated position of a peripheral sensor may be a retracted position that moves the peripheral sensor out of the crush zone of the vehicle. In some examples, the activated position of a peripheral sensor may be a rotated position that reduces the likelihood of direct contact between the peripheral sensor and the object impacting the vehicle. In some examples, the activated position of a peripheral sensor is a rotated-and-retracted position relative to the non-activated position of the peripheral sensor.

Turning to the figures, FIG. 1 illustrates a vehicle 100 (sometimes referred to herein as a "host vehicle") operating in accordance with the teachings of this disclosure. The vehicle 100 may be a standard gasoline powered vehicle, a hybrid vehicle, an electric vehicle, a fuel cell vehicle, and/or any other mobility implemented type of vehicle. The host vehicle 100 may be any type of motor vehicle, such as a car, a truck, a semi-trailer truck, or a motorcycle, etc. The host vehicle 100 includes parts related to mobility, such as a powertrain with an engine, a transmission, a suspension, a driveshaft, and/or wheels, etc. The host vehicle 100 may be non-autonomous, semi-autonomous (e.g., some routine motive functions controlled by the host vehicle 100), or autonomous (e.g., motive functions are controlled by the host vehicle 100 without direct driver input).

In the illustrated example of FIG. 1, the vehicle 100 includes a body control module (BCM) 102, an advanced driving assistance system (ADAS) 104, an inter-vehicle communication module (IVCM) 106, an on-board communication module (OBCM) 108, an infotainment head unit (IHU) 110, and a sensor protector 112.

The body control module (BCM) 102 controls one or more subsystems throughout the vehicle 100, such as power windows, power locks, an immobilizer system, power mirrors, etc. For example, the body control module 102 includes circuits that drive one or more of relays (e.g., to control wiper fluid, etc.), brushed direct current (DC) motors (e.g., to control power seats, power locks, power windows, wipers, etc.), stepper motors, LEDs, etc.

The advanced driving assistance system (ADAS) 104 facilitates situational awareness around the vehicle 100. The ADAS 104 may include or may be incorporated into vehicle systems that provide guidance and assistance to drivers, such as blind spot detection and rear collision warning, etc. The ADAS 104 uses sensors (e.g., the sensors 806 of FIG. 8 below) to detect and identify objects (e.g. vehicles, pedestrian, traffic signs, etc.) around the vehicle 100.

The inter-vehicle communication module (IVCM) 106 includes antenna(s), radio(s) and software to broadcast messages and to establish communication between the vehicle 100 and target vehicles, roadside units, and/or mobile device-based modules (not shown). More information on the inter-vehicle communication network and how the network may communicate with vehicle hardware and software is available in the U.S. Department of Transportation's Core June 2011 System Requirements Specification (http://www.its.dot.gov/meetings/pdf/CoreSystem_SE_SyRS_RevA%20(2011-06-13).pdf), which is herein incorporated by reference in its entirety along with all of the documents referenced on pages 11 to 14 of the SyRS report. The inter-vehicle communication systems may be installed on vehicles and along roadsides on infrastructure. The inter-vehicle communication systems incorporated into infrastructure (e.g., traffic signals, street lights, municipal cameras, etc.) is known as a "roadside" system or unit. Inter-vehicle communication may be combined with other technologies, such as Global Position System (GPS), Visual Light Communication (VLC), Cellular Communications, and short range radar, facilitating the vehicles communicating their position, speed, heading, relative position to other objects and to exchange information with other vehicles or external computer systems. Inter-vehicle communication systems can be integrated with other systems such as mobile phones.

In some examples, the inter-vehicle communication module 106 implements the Dedicated Short Range Communication (DSRC) protocol. Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system, it is also meant to cover dedicated wireless communication systems between cars and roadside infrastructure systems, which are integrated with GPS and are based on an IEEE 802.11 protocol for wireless local area networks (such as, 802.11p, etc.).

The on-board communications module (OBCM) 108 includes wired or wireless network interfaces to enable communication with external networks. The on-board communications module 108 includes hardware (e.g., processors, memory, storage, antenna, etc.) and software to control the wires and/or wireless network interfaces. In the illustrated example, the on-board communications module 108 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); local area wireless network (including IEEE 802.11 a/b/g/n/ac or others), and Wireless Gigabit (IEEE 802.11ad), etc.). In some examples, the on-board communications module 108 includes a wired and/or wireless interface (e.g., an auxiliary port, a Universal Serial Bus (USB) port, a Bluetooth® wireless node, etc.) to communicatively couple with a mobile device (e.g., a smartphone, a smart watch, a tablet, etc.). In such examples, the vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols. In some examples, the vehicle 100 communicates with an external server, via the on-board communications module 108 to receive information (e.g., weather, traffic, etc.) about a current location of the vehicle 100.

The infotainment head unit (IHU) 110 provides an interface between the vehicle 100 and a user. The infotainment head unit 110 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices, etc.) actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 110 includes hardware (e.g., a processor or controller, memory, storage, etc.) and software (e.g., an operating system, etc.) for an infotainment system (such as SYNC® and MyFord Touch® by Ford®. Additionally, the infotainment head unit 110 displays the infotainment system on, for example, the center console display.

In the illustrated example of FIG. 1, the vehicle 100 includes the sensor protector 112 to facilitate active protection of peripheral sensors of the vehicle 100. The sensor protector 112 monitors the vehicle 100 for an impending collision, determines portion(s) of the vehicle 100 that may be impacted in response to detecting an impending collision, and activates (or triggers) a sensor protection mechanism for the sensor(s) positioned in the determined portion(s) of the vehicle 100. For example, the sensor protector 112 causes the sensor to move from its original position to a safe position. The sensor protector 112 then continues monitoring the vehicle 100 to determine whether the collision occurs and, if no collision occurred, the sensor protector 112 returns the activated sensors to their original position (e.g., at or near the periphery of the vehicle 100). However, if a collision does occur, the sensor protector 112 requests and analyzes diagnostic information from the sensors(s) and/or other control systems of the vehicle (e.g., the BCM 102, the ADAS 104, the IVCM 106 and/or the OBCM 108). In some such examples, the sensor protector 112 determines whether each of the sensors can be returned to their original position, and returns them to their original position, if appropriate. Otherwise, the sensor protector 112 keeps the respective sensors in their safe position until a proper inspection is performed on the sensors.

In the illustrated example of FIG. 1, the vehicle 100 includes active protection sensors 114 that are positioned in the front of the vehicle 100 (e.g., in the front bumper of the vehicle 100). Each of the active protection sensors 114 is coupled to a corresponding actuator 116 to facilitate triggering the sensor protection mechanism for the respective active protection sensor 114. For example, a first actuator 116*a* is coupled to a first active protection sensor 114*a*. When triggered (e.g., by the sensor protector 112), the first actuator 116*a* can cause the first active protection sensor 114*a* to move from a non-activated position to an activated position. The first actuator 116*a* can also cause the first active protection sensor 114*a* to move from the activated position to the non-activated position. In the illustrated example, the first active protection sensor 114*a* and the first actuator 116*a* are positioned in the front-left portion of the vehicle 100.

The example vehicle also includes a second actuator 116*b* that is coupled to a second active protection sensor 114*b*. Similar to the first actuator 116*a*, the second actuator 116*b* is configured to move the second active protection sensor 114*b* from its non-activated position to its activated position, and from its activated position to its non-activated position, when appropriate. In the illustrated example of FIG. 1, the second active protection sensor 114*b* and the second actuator 116*b* are positioned in the front-center portion of the vehicle 100.

The example vehicle also includes a third actuator 116*c* that is coupled to a third active protection sensor 114*c*. Similar to the first actuator 116*a* and the second actuator 116*b*, the third actuator 116*c* is configured to move the third active protection sensor 114*c* from its non-activated position to its activated position, and from its activated position to its non-activated position, when appropriate. In the illustrated example of FIG. 1, the third active protection sensor 114*c* and the third actuator 116*c* are positioned in the front-right portion of the vehicle 100.

In the illustrated example, the sensor protector 112 monitors the vehicle 100 for an impending collision. For example, the sensor protector 112 obtains (e.g., continuously obtains, periodically obtains, and/or aperiodically obtains) information from the sensors and/or other control systems of the vehicle 100 to detect and identify objects (e.g., vehicles, pedestrians, traffic signs, etc.) around the vehicle 100, in the path of the vehicle 100, and/or projected to be in the path of the vehicle 100.

When the sensor protector 112 detects an impending collision, the sensor protector 112 determines a plurality of characteristics associated with the detected impending collision. For example, the sensor protector 112 may determine which portion(s) of the vehicle 100 are likely to be impacted if the collision occurs (e.g., the front-left side of the vehicle 100), identify one or more active protection sensor(s) 114 included in the determined portion(s) of the vehicle 100 (e.g., the first active protection sensor 114*a*), determine an activation period based on when the impending collision is expected to occur (e.g., three seconds from the moment of detection), the expected direction of impact if the collision occurs, etc. In some examples, the sensor protector 112 modifies the determined activation period. For example, the sensor protector 112 may add a delta (e.g., two seconds) to the expected time of impact when determining the activation period.

The example sensor protector 112 of FIG. 1 then activates a sensor protection mechanism for each of the identified active protection sensors 114. In the illustrated example, the sensor protector 112 triggers the corresponding actuator 116 to activate the sensor protection mechanism. As described below in connection with FIGS. 2 to 7, when the sensor protector 112 activates the sensor protection mechanism for an active protection sensor 114, the active protection sensor 114 may retract from its non-activated position to its activated position, may rotate from its non-activated position to its activated position, and/or may rotate-and-retract from its non-activated position to its activated position.

In some examples, the sensor protector 112 activates the sensor protection mechanism for an active protection sensor 114 based on an expected angle and/or position of impact with respect to the vehicle 100. For example, in a head-on collision, the sensor protector 112 may activate the sensor protection mechanism for one or more of the active protection sensors 114 by retracting them from their non-activated positions to their activated position to move the respective active protection sensors 114 out of an expected crush (or crumple) zone of the front of the vehicle 100. In other examples, the sensor protector 112 may determine that rotating the one or more active protection sensor(s) 114 from their non-activated position to their activated position is more likely to protect the integrity (or functionality) of the respective active protection sensors 114. In other examples, the sensor protector 112 may determine that rotating-and-retracting the one or more active protection sensor(s) 114 from their non-activated position to their activated position is more likely to protect the integrity of the respective active protection sensors 114.

After the sensor protector 112 triggers the respective sensor protection mechanisms for the identified active protection sensors 114, the sensor protector 112 continues monitoring the vehicle 100 for the impending collision. For example, the sensor protector 112 may identify changes in the path of the vehicle 100 and/or the expected object of collision. In some examples, the sensor protector 112 continues monitoring the vehicle 100 for the impending collision until the threat of the impending collision is no longer present (e.g., in response to a change in path of the vehicle 100 and/or the expected object of collision, an update in an impending collision calculation, etc.). In some examples, the sensor protector 112 continues monitoring the vehicle 100 for the impending collision until the activation period expires. For example, if the activation period is three seconds, the sensor protector 112 continues monitoring the vehicle 100 for the impending collision for three seconds.

Once the sensor protector 112 determines that the impending collision is not occurring (or did not occur), the sensor protector 112 causes the active protection sensors 114 to return to their non-activated position. For example, the sensor protector 112 causes the first actuator 116*a* to move the first active protection sensor 114*a* from its activated position to its non-activated position.

In the unfortunate scenario where a collision between the vehicle 100 and another object does occur, the example sensor protector 112 performs post-impact diagnostics on the active protection sensors 114 of the vehicle 100. By performing post-impact diagnostics, the sensor protector 112 is able to confirm that the active protection sensors 114 are able to be returned to their non-activated positions and are properly functioning (e.g., as designed and calibrated). For example, when the vehicle 100 is manufactured or from time-to-time (e.g., after a major repair, etc.), the sensor protector 112 determines (or measures) reference positions (e.g., 2-D coordinates, 3-D coordinates, etc.) of each of the active protection sensors 114. In some examples, the reference positions indicate a position of the corresponding active protection sensor 114 relative to the vehicle 100 and/or another component of the vehicle 100. In some examples, the reference positions include an orientation of the active protection sensors 114. The reference positions are stored in memory (e.g., memory 810 of FIG. 8 below) of the vehicle 100 and are used by the sensor protector 112 to detect changes in the position and/or orientation of the active protection sensors 114 indicative of a misaligned active protection sensor and/or a sensor operating with diminished capabilities.

In the illustrated example, respective to a collision occurring, the sensor protector 112 requests diagnostic information from the active protection sensors 114 and/or the other control systems of the vehicle 100. The obtained diagnostic information may include, for example, whether the sensor protection mechanism was triggered for an active protection sensor 114, whether an active protection sensor 114 is disconnected or experiencing an electrical issue, whether an actuator 116 was triggered, whether an active protection sensor 114 was activated (e.g., caused to move from a non-activated position to an activated position in response to either a triggered activation or a physical activation), position information and/or proximity information of the active protection sensor 114 relative to the periphery of the vehicle 100 and/or relative to another component of the vehicle 100, etc.

The example sensor protector 112 analyzes the obtained diagnostic information to determine, for each active protection sensor 114 of the vehicle 100, whether to keep the active protection sensor 114 in its non-activated position, keep the active protection sensor 114 in its activated position, move the active protection sensor 114 from its activated position to its non-activated position, or move the active protection sensor 114 from its non-activated position to its activated position.

In some examples, to determine whether to keep the first active protection sensor 114*a* in its non-activated position, the sensor protector 112 confirms, based on the obtained diagnostic information, that the sensor protector 112 did not trigger activation of the sensor protection mechanism for the first active protection sensor 114*a*. Additionally or alternatively, the sensor protector 112 may confirm, based on the obtained diagnostic information, that the first actuator 116*a* was not triggered (e.g., by the sensor protector 112). Additionally or alternatively, the sensor protector 112 may confirm, based on the obtained diagnostic information, that the position and orientation information of the first active protection sensor 114*a* is the same as (or within a threshold difference of) the reference position and orientation information associated with the first active protection sensor 114*a*.

In some examples, to determine whether to keep the first active protection sensor 114*a* in its activated position, the sensor protector 112 confirms, based on the obtained diagnostic information, that the first active protection sensor 114*a* is not in its non-activated position. Additionally or alternatively, the sensor protector 112 may confirm, based on the obtained diagnostic information, that the position and/or orientation information of the first active protection sensor 114*a* is not the same as (and not within a threshold difference of) the reference position and/or orientation information associated with the first active protection sensor 114*a*. Additionally or alternatively, the sensor protector 112 may confirm, based on the obtained diagnostic information, that the first actuator 116*a* is unable to move the first active protection sensor 114*a* from the activated position to the non-activated position. For example, the sensor protector 112 may determine that there is an electrical disconnection between the first actuator 116*a* and the first active protection sensor 114*a*. Additionally or alternatively, the sensor protector 112 may determine that the structure of the vehicle 100 is damaged and that the first active protection sensor 114*a* cannot be returned to its original position.

In some examples, to determine whether to move the first active protection sensor 114*a* from its activated position to its non-activated position, the sensor protector 112 confirms, based on the obtained diagnostic information, that the sensor protection mechanism was activated (e.g., triggered activation or physical activation) for the first active protection sensor 114*a*. Additionally or alternatively, the sensor protector may confirm, based on the obtained diagnostic information, that the first actuator 116*a* is able to move the first active protection sensor 114*a* from the activated position to the non-activated position. In some examples, the sensor protector 112 displays, via the infotainment head unit 110, instructions on how to manually move the first active protection sensor 114*a* from its activated position to its non-activated position.

In some examples, after the active protection sensor 114 is moved from the activated position to the non-activated position (e.g., automatically by the sensor protector 112 or manually), the sensor protector 112 verifies that the active protection sensor 114 is in the correct position. For example, the sensor protector 112 may request updated position and orientation information from the first active protection sensor 114*a* and compare the updated information to the reference position and orientation information associated with the first active protection sensor 114*a*. If the sensor protector 112 determines that the updated position and orientation information is not the same as (or within a threshold difference of) the reference position and orientation information, the sensor protector 112 determines that the first active protection sensor 114*a* is not properly calibrated and return the first active protection sensor 114*a* to its activated position.

In some examples, to determine whether to move the first active protection sensor 114*a* from its non-activated position to its activated position, the sensor protector 112 confirms, based on the obtained diagnostic information, that the position and/or orientation information of the first active protection sensor 114*a* is not the same as (or within a threshold difference of) the reference position and orientation information associated with the first active protection sensor 114*a*. Additionally or alternatively, the sensor protector 112 may confirm, based on the obtained diagnostic information, that the sensor protection mechanism for the first active protection sensor 114*a* was triggered but that the position and orientation information of the first active protection sensor 114*a* indicate that the first active protection sensor 114*a* did not move to its activated position.

In some examples, after the sensor protector 112 analyzes the obtained diagnostic information and determines whether to keep or move each of the active protection sensors 114, the sensor protector 112 notifies the user. For example, the sensor protector 112 may display, via the infotainment head unit 110, the status of each of the active protection sensors 114. For example, the sensor protector 112 may generate a model of the vehicle 100 and display the position of each of the active protection sensors 114 relative to the model of the vehicle 100 and whether the active protection sensor 114 is in the activated position or the non-activated position. The sensor protector 112 may, additionally or alternatively, display, based on the obtained diagnostic information, whether any of the active protection sensors 114 are damaged and/or need repair.

In some examples, the sensor protector 112 generates a report indicating the status of each of the active protection sensors 114 of the vehicle 100. For example, the generated report may include, for each active protection sensor 114, whether the corresponding actuator 116 was activated (e.g., prior to the collision), whether the active protection sensor 114 moved (e.g., during or after the collision), whether the active protection sensor 114 is in the activated positon or the non-activated position, whether the active protection sensor 114 was returned from the activated position to the non-activated position, whether the active protection sensor 114 was moved from the non-activated position to the activated position post-impact, and/or whether the sensor protector 112 determined it was not possible to return the active protection sensor 114 from the activated position to the non-activated position. However, it should be appreciated that the generated report may include additional or alternative information related to the status of the active protection sensors 114 and/or the actuators 116.

FIGS. 2 to 5 illustrate an example embodiment of the active protection sensor 114 of the vehicle 100 of FIG. 1. The active protection sensor 114 illustrated in FIGS. 2 to 5 generally includes a sensor 202 that is mounted to an active protection housing 204. The sensor 202 may be mounted to the active protection housing 204 via one or more fasteners. In this example embodiment, the active protection housing 204 includes a front upper bracket 206 and a front lower bracket 208. The front upper bracket 206 and the front lower bracket 208 provide protection to the sensor 202 from direct impacts (e.g., during a collision).

In this illustrated embodiment, the active protection housing 204 includes a c-shaped groove 210 that adds a degree of freedom to the active protection sensor 114. For example, during a collision, the force of the impact may cause the active protection sensor (e.g., the active protection housing 204 and the sensor 202) to rotate along the c-shaped groove 210 (e.g., swivel around the y-axis).

In this illustrated embodiment, the active protection housing 204 is mounted to a bracket 212 including a bracket arm 214. The bracket 212 is attached to a rail or structure (e.g., a bumper) of the vehicle 100. For example, the active protection sensor 114 illustrated in FIGS. 2 to 5 may be positioned and embedded within a front bumper of the vehicle 100.

Although now shown in this illustrated embodiment, in some examples, the bracket arm 214 may include a longitudinal groove along the inner surface of the bracket arm 214. In some such examples, the longitudinal groove may operate as a rail to enable the active protection sensor (e.g., the active protection housing 204 and the sensor 202) to "back-slide" or retract away from the front structure (e.g., the fascia of the front bumper) of the vehicle 100 due to the force of the impact during a collision. Thus, even if the sensor protector 112 does not activate the sensor protection mechanism for the active protection sensor 114, the active protection sensor includes mechanisms to physically activate the sensor protection mechanism.

In this example embodiment, the active protection sensor 114 is coupled to the actuator 116. As described above, in some examples, the sensor protector 112 of FIG. 1 triggers a sensor protection mechanism of the active protection sensor 114. In this example embodiment, when the sensor protection mechanism is triggered for the active protection sensor 114, the actuator 116 causes the active protection sensor (e.g., the active protection housing 204 and the sensor 202) to move from its non-activated position. For example, the actuator 116 may cause the active protection sensor (e.g., the active protection housing 204 and the sensor 202) to rotate along the c-shaped groove 210 of the active protection housing 204. In some examples, the actuator 116 may cause the active protection sensor (e.g., the active protection housing 204 and the sensor 202) to "back-slide" or retract away from the front structure of the vehicle 100 along, for example, the longitudinal groove of the bracket arm 214. In some examples, the actuator 116 may cause the active protection sensor (e.g., the active protection housing 204 and the sensor 202) to rotate along the c-shaped groove 210 of the active protection housing 204 and to retract away from the front structure of the vehicle 100 along, for example, the longitudinal groove of the bracket arm 214. As described above, the actuator 116 may also cause the active protection sensor (e.g., the active protection housing 204 and the sensor 202) to move from the activated position back to its non-activated position.

In this illustrated embodiment, the active protection housing 204 includes a proximity sensor 216. The proximity sensor 216 detects position and orientation information of the sensor 202, the active protection housing 204, and/or, more generally, the active protection sensor 114 relative to the vehicle 100, the front structure of the vehicle 100 and/or another structure of the vehicle 100. However, it should be appreciated that other techniques for detecting the position and/or orientation information of the sensor 202, the active protection housing 204, and/or the active protection sensor 114 may additionally or alternatively be used. For example, the sensor 202, the active protection housing 204, and/or the active protection sensor 114 may include an accelerometer and/or a gyroscope. In some examples, the sensor 202, the active protection housing 204, and/or the active protection sensor 114 may include electrical contacts that align when properly calibrated and can become misaligned due to the force of impact during a collision.

Figure 6A:
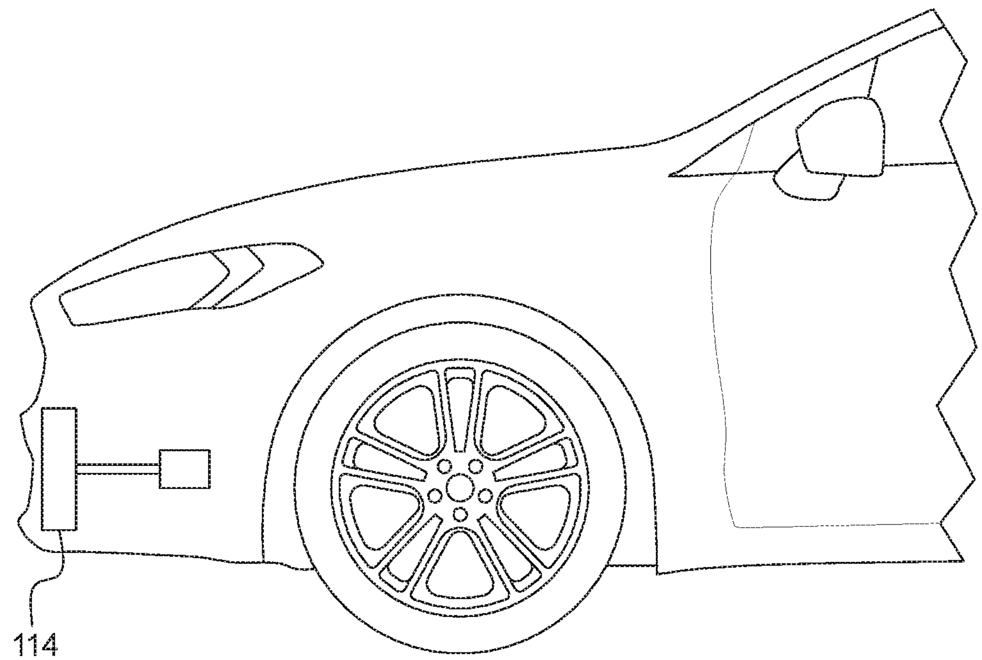
FIG. 6A and FIG. 6B are side diagrammatical views of one example embodiment of the active protection sensor transitioning from a non-activated position to an activated position.
Figure 6B:
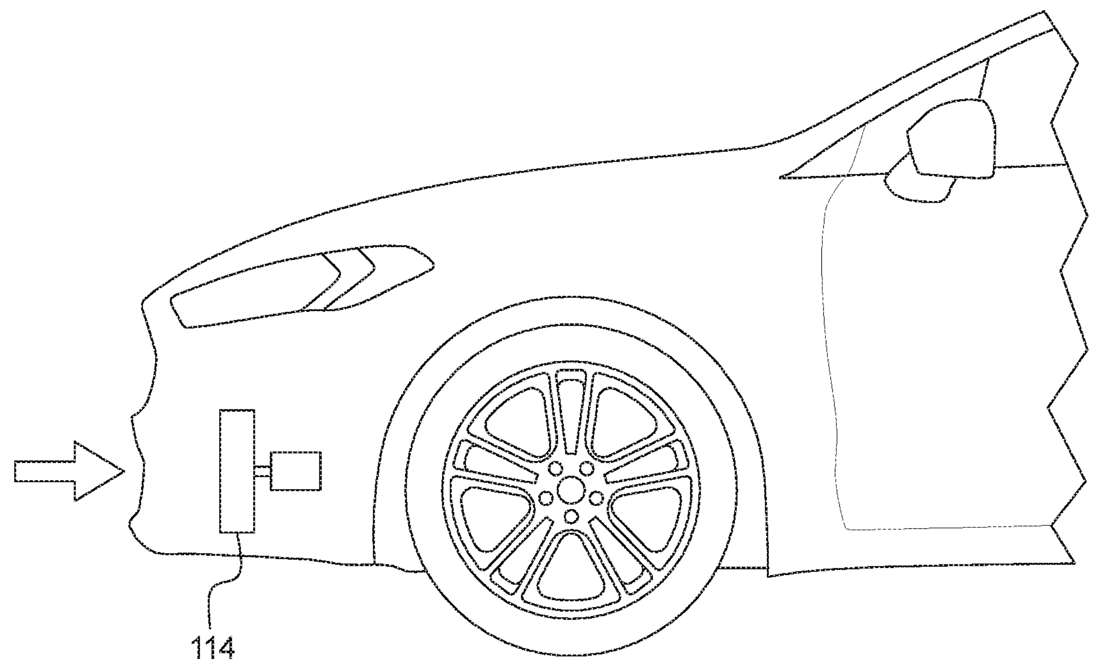

FIG. 6A and FIG. 6B illustrate side diagrammatical views of the vehicle 100 including one example embodiment of the active protection sensor 114 transitioning from its non-activated position to its activated position. In the illustrated embodiment of FIGS. 6A and 6B, the active protection sensor 114 "back-slides" or retracts away from the front structure (e.g., the fascia of the bumper) of the vehicle 100. For example, in FIG. 6A, the active protection sensor 114 is positioned in its non-activated position at or near the periphery of the vehicle 100. In FIG. 6B, the active protection sensor 114 is positioned in its activated position away from the periphery of the vehicle 100. The active protection sensor 114 moves from the non-activated position of FIG. 6A to the activated position of FIG. 6B when the sensor protection mechanism of the active protection sensor 114 is activated. As described above, the sensor protection mechanism may be triggered by the sensor protector 112 of FIG. 1 (e.g., due to a detected impending collision) or physically activated (e.g., due to the force of impact during a collision).

Figure 7A:
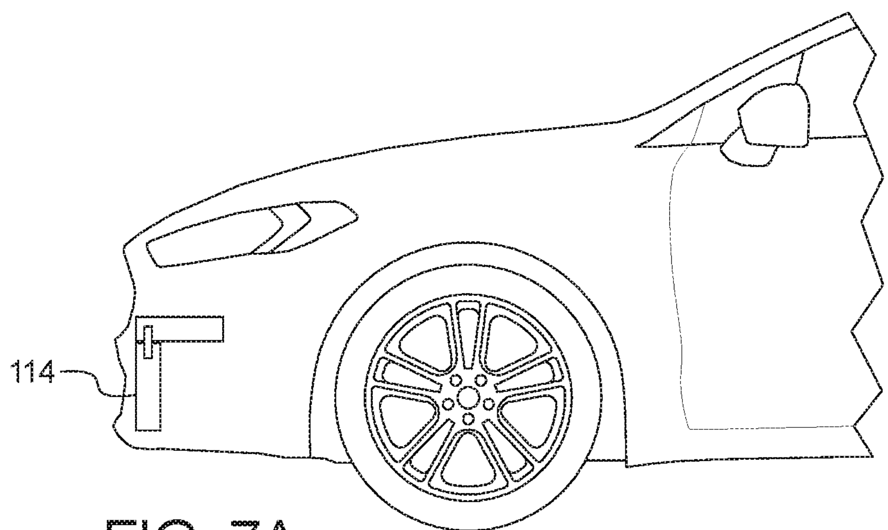
FIG. 7A, FIG. 7B, and FIG. 7C are side diagrammatical views of another example embodiment of the active protection sensor transitioning from the non-activated position to the activated position.
Figure 7B:
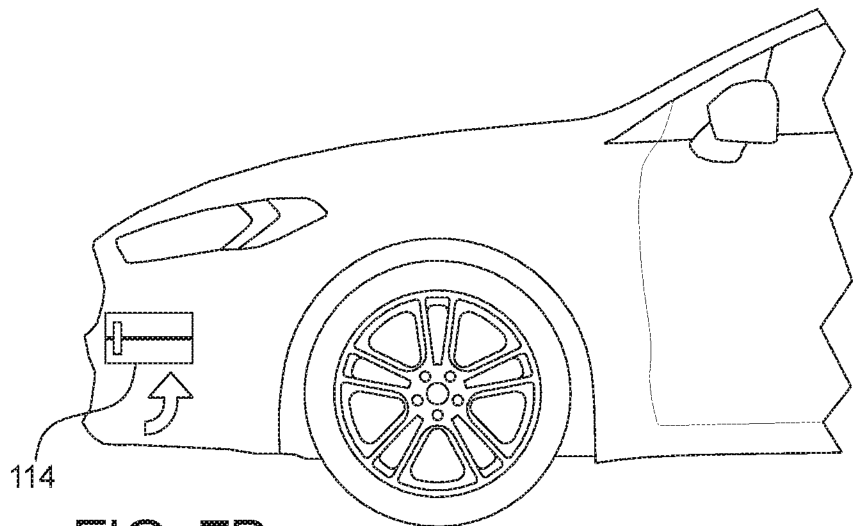
Figure 7C:
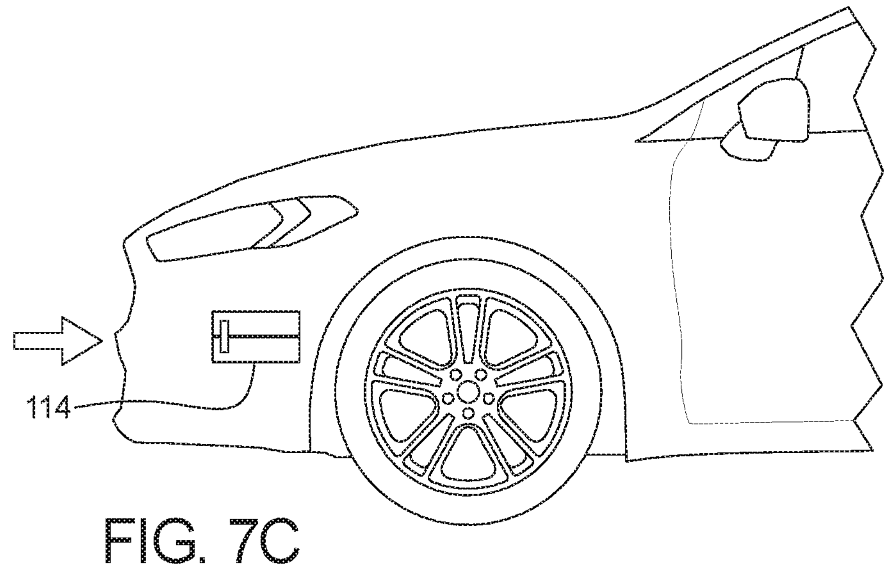

FIG. 7A, FIG. 7B, and FIG. 7C illustrate side diagrammatical views of the vehicle 100 including one example embodiment of the active protection sensor 114 transitioning from its non-activated position to its activated position. In the illustrated embodiment of FIGS. 7A, 7B, and 7C, the active protection sensor 114 rotates away from the front structure (e.g., the fascia of the bumper) of the vehicle 100. For example, in FIG. 7A, the active protection sensor 114 is positioned in its non-activated position at or near the periphery of the vehicle 100. In FIG. 7B, the active protection sensor 114 rotates into a transition position. For example, the active protection sensor 114 may rotate along the c-shaped groove 210 of the active protection housing 204 illustrated in FIGS. 2 to 5. In FIG. 7C, the active protection sensor 114 "back-slides" away from the transition position to the activated position. For example, the active protection sensor 114 may retract away from the front structure (e.g., the fascia of the bumper) of the vehicle 100 along a longitudinal groove of the bracket arm 214 of FIGS. 2 to 5. The active protection sensor 114 moves from the non-activated position of FIG. 7A to the activated position of FIG. 7C when the sensor protection mechanism of the active protection sensor 114 is activated. As described above, the sensor protection mechanism may be triggered by the sensor protector 112 of FIG. 1 (e.g., due to a detected impending collision) or physically activated (e.g., due to the force of impact during a collision).

Figure 8:
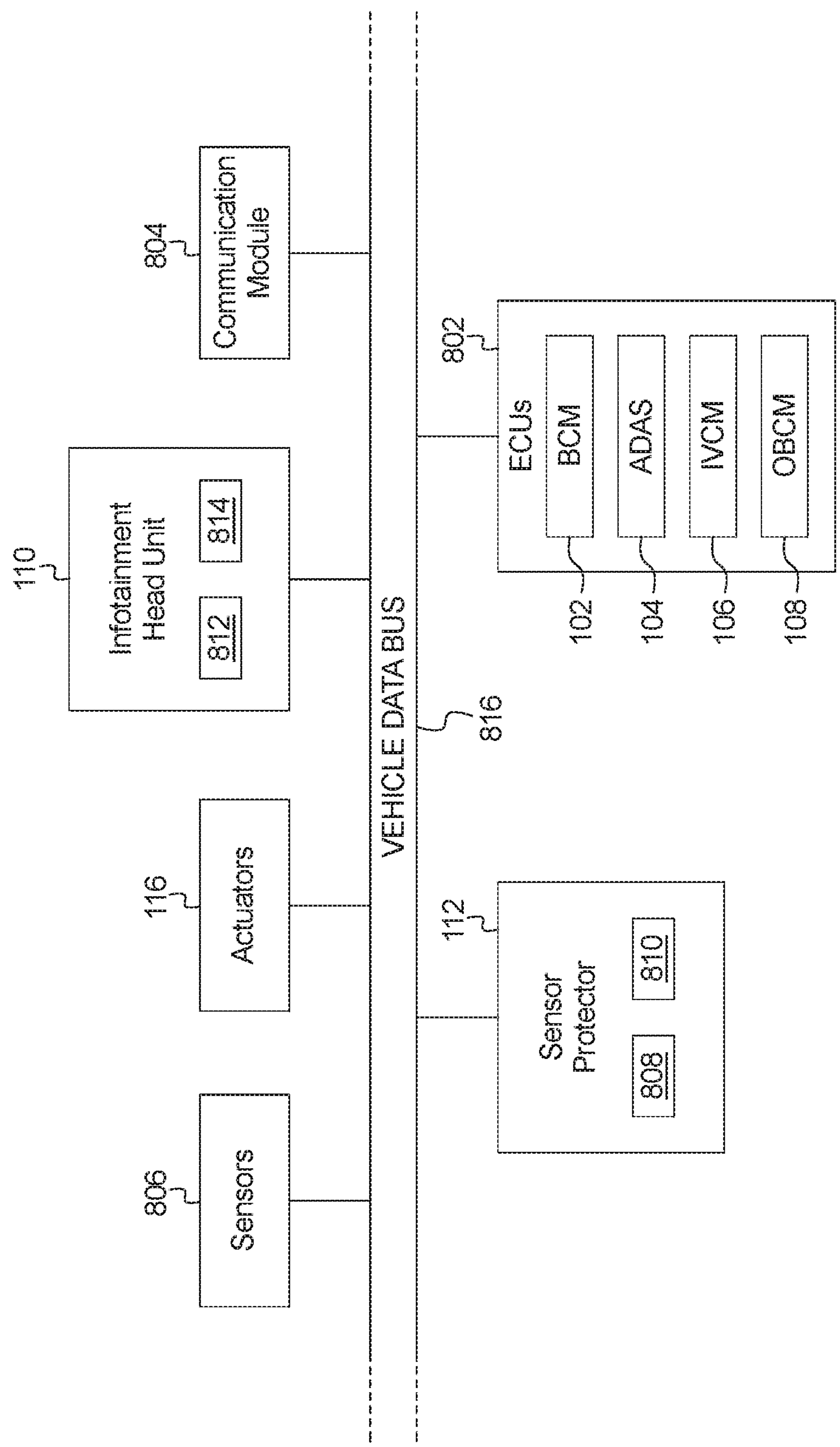
FIG. 8 is a block diagram of electronic components of the vehicle of FIG. 1.

FIG. 8 is a block diagram of electronic components 800 of the vehicle 100 of FIG. 1. In the illustrated example, the electronic components 800 include the infotainment head unit 110, the sensor protector 112, the actuators 116, electronic control units 802, a communication module 804, sensors 806, and a vehicle data bus 816.

In the illustrated example of FIG. 8, the infotainment head unit 110 provides an interface between the vehicle 100 and the user. The infotainment head unit 110 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a display device 812 (e.g., a heads-up display, a center console display such as a liquid crystal display (LCD), an organic light emitting diode (OLED) display, a flat panel display, a solid state display, etc.), and/or speakers 814. For example, the display device 812, the speakers 814, and/or other output device(s) of the infotainment head unit 110 present information, such as tire pressure measurements, to the user. Further, the infotainment head unit 110 of the illustrated example includes hardware (e.g., a processor or controller, memory, storage, etc.) and software (e.g., an operating system, etc.) for an infotainment system (such as SYNC® and MyFord Touch® by Ford®. Additionally, the infotainment head unit 110 displays the infotainment system on, for example, the display device 812.

In the illustrated example of FIG. 8, the sensor protector 112 includes a processor or controller 808 and memory 810. In some examples, the sensor protector 112, including the processor 808 and the memory 810, may be incorporated into another electronic control unit (ECU) with its own processor and memory, such as the example ECUs 802.

The processor 808 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 810 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 810 includes multiple kinds of memory, particularly volatile memory and non-volatile memory.

The memory 810 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 810, the computer readable medium, and/or within the processor 808 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The actuators 116 are coupled (e.g., electrically coupled) to the active protection sensors 114. In the illustrated example, the actuators 116 are electric actuators that convert electrical energy into mechanical torque to move the active protection sensors 114 from their respective non-activated positions to their activated positions. For example, the first actuator 116*a* may cause the first active protection sensor 114*a* to move from non-activated position to its activated position in response to the sensor protector 112 detecting an impending collision. The example actuators 116 may also move the active protection sensors 114 from their respective activated position to their non-activated positions. For example, the first actuator 116*a* may cause the first active protection sensor 114*a* to move its activated position to its non-activated position in response to the sensor protector 112 determining that the detected impending collision did not occur, or in response to the sensor protector 112 determining a collision occurred and that the first active protection sensor 114*a* can be returned to its non-activated position. It should be appreciated that other techniques for moving the active protection sensors 114 between their respective non-activated position and their activated position may additionally or alternatively be used.

The electronic control units 802 monitor and control the subsystems of the vehicle 100. For example, the ECUs 802 are discrete sets of electronics that include their own circuit(s) (e.g., integrated circuits, microprocessors, memory, storage, etc.) and firmware, sensors, actuators, and/or mounting hardware. The ECUs 802 communicate and exchange information via a vehicle data bus (e.g., the vehicle data bus 816). Additionally, the ECUs 802 may communicate properties (e.g., status of the ECUs 802, sensor readings, control state, error and diagnostic codes, etc.) to and/or receive requests from each other. For example, the vehicle 100 may have seventy or more of the ECUs 802 that are positioned in various locations around the vehicle 100 and are communicatively coupled by the vehicle data bus 816. In the illustrated example, the ECUs 802 include the BCM 102, the ADAS 104, the IVCM 106, the OBCM 108, and the sensor protector 112.

Although shown separately in FIG. 8, it should be appreciated that the sensor protector 112 is an electronic control unit of the vehicle 100.

In some examples, the ECUs 802 include an autonomy unit that controls performance of autonomous and/or semi-autonomous driving maneuvers of the vehicle 100 based upon, at least in part, image(s) and/or video that are received and/or captured by the sensors 806 and/or received from another ECU of the vehicle 100.

The communication module 804 includes one or more antennas configured to receive data from one or more sources. For example, the communication module 804 may be communicatively coupled to the sensor protector 112, the active protection sensors 114, the actuators 116, and/or the sensors 806.

The sensors 806 may be arranged in and around the vehicle 100 in any suitable fashion. The sensors 806 may mounted to measure properties around the exterior of the vehicle 100. Additionally, some sensors 806 may be mounted inside the cabin of the vehicle 100 or in the body of the vehicle 100 (such as, the engine compartment, the wheel wells, etc.) to measure properties in the interior of the vehicle 100. For example, such sensors 806 may include accelerometers, odometers, tachometers, pitch and yaw sensors, wheel speed sensors, microphones, tire pressure sensors, image cameras, video cameras, and biometric sensors, etc. In the illustrated example, the sensors 806 include range detection sensors. The range detection sensors are sensors that detect and measure objects (such as a target vehicle or object) in the vicinity of the vehicle 100. The sensors 806 may include, for example, RADAR, LiDAR, ultrasonic sensors, and/or infrared sensors, etc.

In some examples, one or more of the sensors 806 are periphery sensors that are mounted in an active protection housing, such as the example sensors 202 mounted in the example active protection housing 204 of the active protection sensors 114 of FIGS. 2 to 5.

The vehicle data bus 816 communicatively couples the infotainment head unit 110, the sensor protector 112, the actuators 116, the communication module 804, the sensors 806, and the electronic control units 802, including the BCM 102, the ADAS 104, the IVCM 106, and the OBCM 108. In some examples, the vehicle data bus 816 includes one or more data buses. The vehicle data bus 816 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 9:
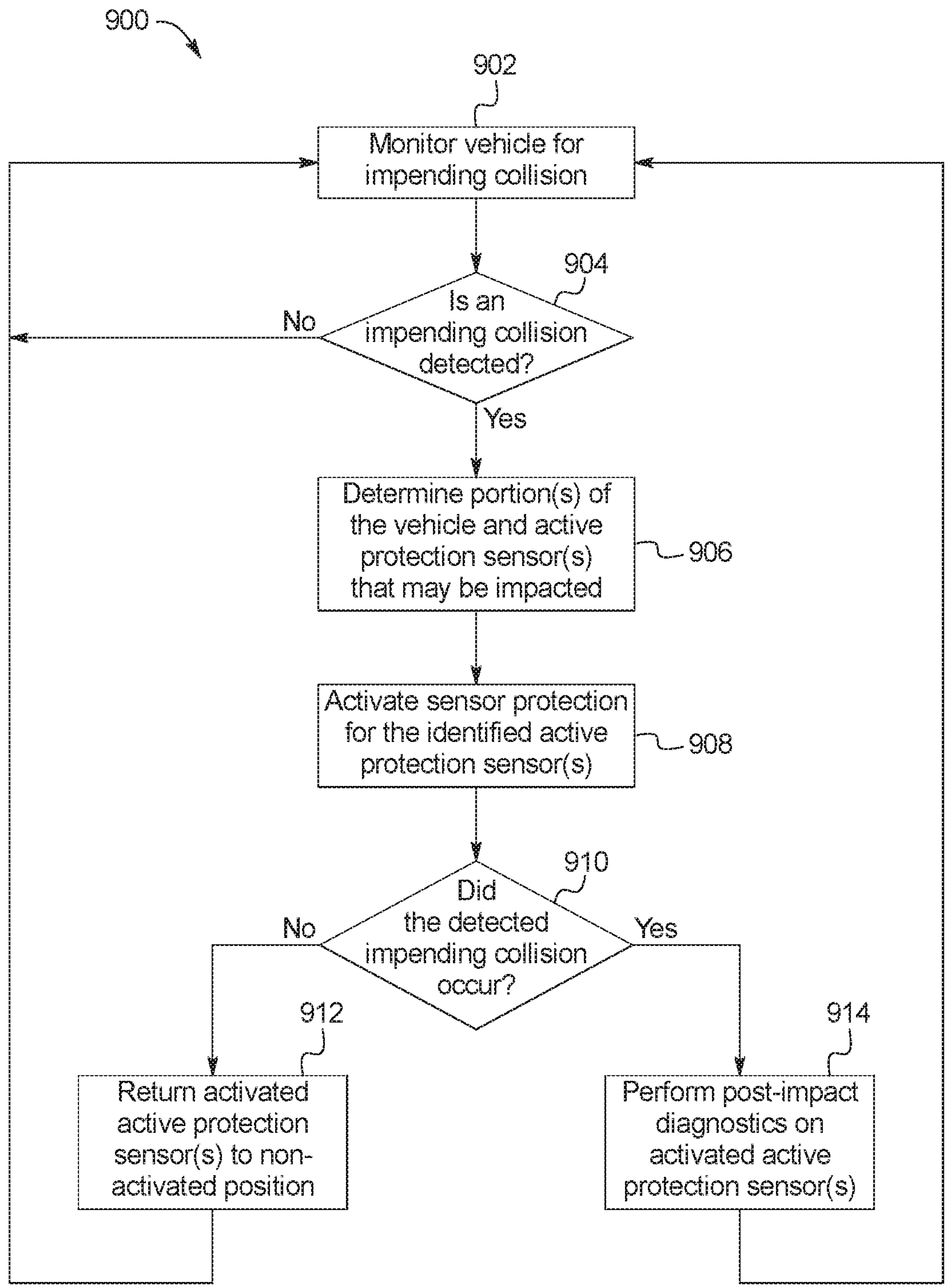
FIG. 9 is a flowchart of a method to activate the active protection sensors of the vehicle of FIGS. 1-8 in response to detecting an impending collision, which may be implemented by the electronic components of FIG. 8.

FIG. 9 is a flowchart of a method 900 to activate active protection sensors of a vehicle in response to detecting an impending collision, which may be implemented by the electronic components 800 of FIG. 8. Initially, at block 902, the example sensor protector 112 monitors the vehicle 100 for an impending collision. For example, the sensor protector 112 uses information provided by the ECUs 802, the sensors 806 and/or the active protection sensors 114 to detect and identify objects (e.g., vehicles, pedestrians, traffic signs, etc.) around the vehicle 100, in the path of the vehicle 100, and/or projected to be in the path of the vehicle 100. If, at block 904, the sensor protector 112 detects an impending collision, then, at block 906, the sensor protector 112 determines portion(s) of the vehicle 100 that may be impacted by the impending collision. The example sensor protector 112 also identifies one or more active protection sensor(s) 114 of the vehicle 100 based on the determined portion(s) of the vehicle 100 that may be impacted by the impending collision. For example, the sensor protector 112 may detect an impending collision where a target vehicle is expected to impact the front-left side of the vehicle 100. The sensor protector 112 may then also identify that the first active protection sensor 114*a* of the vehicle 100 may be impacted by the detected impending collision.

At block 908, the sensor protector 112 activates sensor protection for the identified active protection sensor(s) 114. For example, the sensor protector 112 may cause the first actuator 116*a* to move the first active protection sensor 114*a* (e.g., the active protection housing 204 and the sensor 202) from a non-activated position of the first active protection sensor 114*a* to an activated position of the first active protection sensor 114*a*. In some examples, the sensor protector 112 causes (e.g., triggers) the first actuator 116*a* to retract the first active protection sensor 114*a* from the periphery of the vehicle 100 (as shown in FIG. 6A and FIG. 6B). In some examples, the sensor protector 112 causes (e.g., triggers) the first actuator 116*a* to rotate the first active protection sensor 114*a* to the activated position (as shown in FIG. 7A, FIG. 7B, and FIG. 7C) to change the position of the expected impact relative to the sensor. In some examples, the sensor protector 112 determines which activated position to move the identified active protection sensor(s) 114 based on an expected (or predicted) angle and/or position of impact with respect to the vehicle 100.

At block 910, the sensor protector 112 determines whether the detected impending collision occurred. In some examples, the sensor protector 112 waits for an activation period to expire before determining whether the detected impending collision occurred. For example, when the sensor protector 112 detects the impending collision (at block 904), the sensor protector 112 may also determine an activation period based on when the impending collision is expected to occur (e.g., three seconds from the moment of detection, etc.).

If, at block 910, the sensor protector 112 determines that the detected impending collision did not occur (and the activation period expired), then, at block 912, the sensor protector 112 returns the activated active protection sensor(s) 114 to their non-activated positions. For example, the sensor protector 112 may cause the first actuator 116*a* to cause the first active protection sensor 114*a* to move from the activated (or "safe") position to the non-activated (or "original") position. Control then returns to block 902 and the sensor protector 112 continues monitoring the vehicle 100 for an impending collision.

If, at block 910, the sensor protector 112 determines that the detected impending collision did occur, then, at block 914, the sensor protector 112 performs post-impact diagnostics on the active protection sensor(s) 114 of the vehicle 100. An example technique for performing post-impact diagnostics is described below in connection with the example method 1000 of FIG. 10. Control then returns to block 902 and the sensor protector 112 continues monitoring the vehicle 100 for an impending collision.

Figure 10:
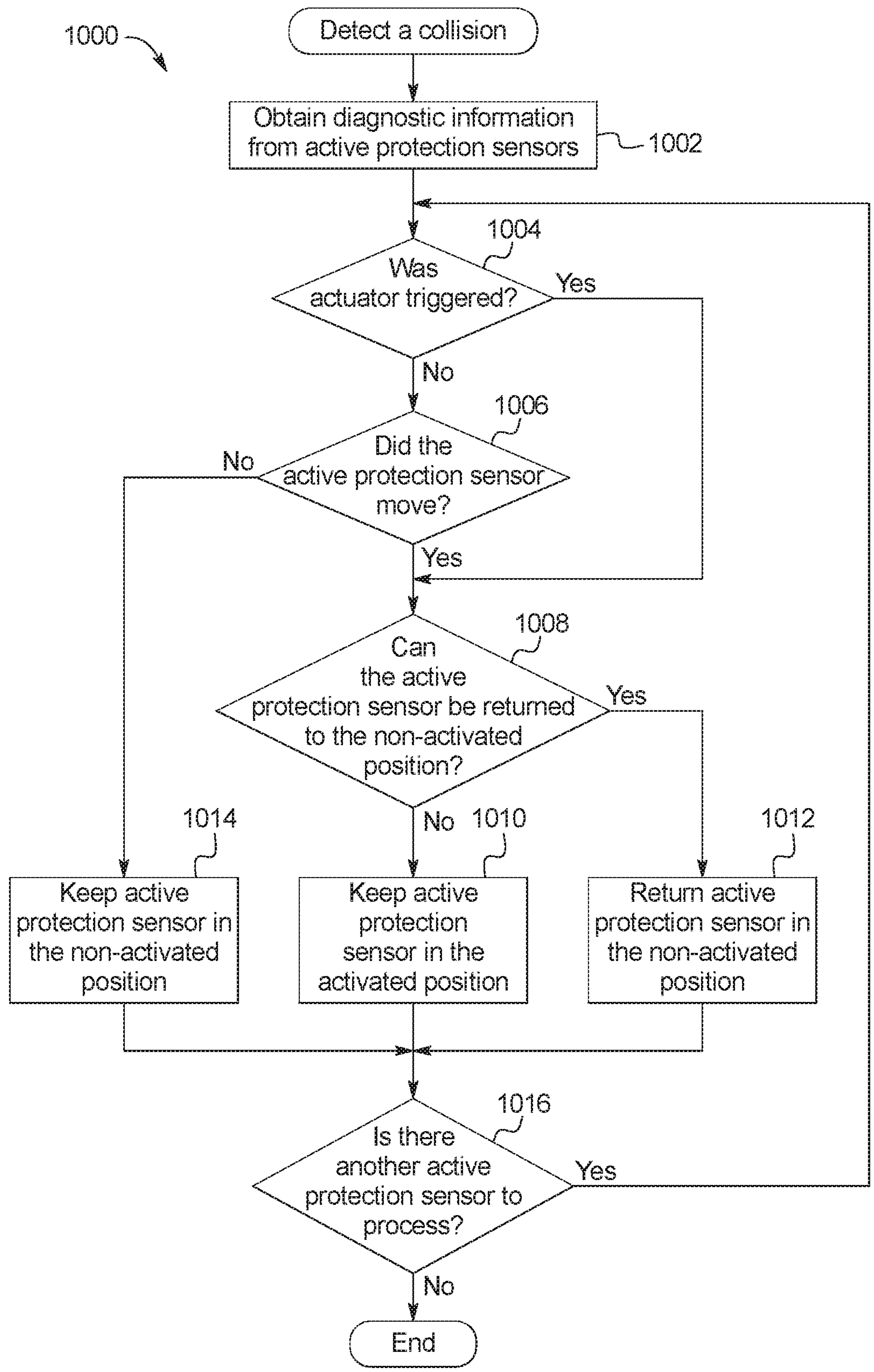
FIG. 10 is a flowchart of a method to perform post-impact diagnostics of the active protection sensors of the vehicle of FIGS. 1-8, which may be implemented by the electronic components of FIG. 8.

FIG. 10 is a flowchart of a method 1000 to perform post-impact diagnostics of the active protection sensors of the vehicle, which may be implemented by the electronic components 800 of FIG. 8. As described above, the active protection sensor(s) 114 of the vehicle 100 may be positioned in an activated position in response to the sensor protector 112 detecting an impending collision (e.g., a triggered activation of the sensor protection mechanism) and/or in response to an actual collision (e.g., when the sensor protector 112 did not detect an impending collision or did not detect an impending collision early enough to trigger the actuation of the active protection sensor(s) 114, and a collision occurred) (e.g., a physical activation of the sensor protection mechanism). The example method 1000 of FIG. 10 is performed in response to the sensor protector 112 detecting a collision of the vehicle 100.

Initially, at block 1002, the sensor protector 112 obtains diagnostic information from the active protection sensors 114 of the vehicle 100. For example, the sensor protector 112 may obtain diagnostic information indicating whether the first active protection sensor 114*a* is disconnected or experiencing an electrical issue, whether the first actuator 116*a* was triggered, whether the first active protection sensor 114*a* was activated (e.g., caused to move from a non-activated position to an activated position in response to either a triggered activation or a physical activation), proximity information of the first active protection sensor 114*a* relative to the periphery of the vehicle 100 and/or relative to another component of the vehicle 100, etc. The sensor protector 112 may also obtain diagnostic information from additional sensors of the vehicle 100 (e.g., non-active protection sensors) and/or other ECUs 802 of the vehicle 100.

At block 1004, the sensor protector 112 determines whether an actuator for a corresponding active protection sensor was triggered. For example, the sensor protector 112 may select an active protection sensor (e.g., the first active protection sensor 114*a*) and determine, based on the obtained diagnostic information, whether the first actuator 116*a* was triggered by the sensor protector 112 to activate sensor protection for the first active protection sensor 116*a*.

If, at block 1004, the sensor protector 112 determined that the actuator for the selected active protection sensor was not triggered, then, at block 1006, the sensor protector 112 determines, based on the obtained diagnostic information, whether the corresponding active protection sensor moved. For example, the sensor protector 112 may compare current positional information of the first active protection sensor 114*a* to reference position information associated with the first active protection sensor 114*a* to determine whether the first active protection sensor 114*a* moved. Additionally or alternatively, the sensor protector 112 may determine whether the active protection sensor 114*a* moved based on a change in alignment of electrical contacts between the active protection housing 204 and the sensor 202 of the active protection sensor. However, it should be appreciated that other techniques for determining whether the active protection sensor moved (such as via proximity sensors, etc.) may additionally or alternatively be used.

If, at block 1006, the sensor protected 112 determined that the active protection sensor did not move, then control proceeds to block 1014 and the active protection sensor stays in the non-activated position. Control then proceeds to block 1016 to determine whether there is another active protection sensor to process (e.g., an unprocessed active protection sensor).

Returning to block 1004, if, at block 1004, the sensor protector 112 determined that the actuator for the selected active protection sensor was triggered, then control proceeds to block 1008 to determine whether the active protection sensor can be returned to its non-activated position.

After the sensor protector 112 determined that the actuator for the selected active protection sensor was triggered (at block 1004), or after the sensor protector 112 determined that the selected active protection sensor moved (at block 1006), then, at block 1008, the sensor protector 112 determines whether the active protection sensor can be returned to its non-activated position. For example, the sensor protector 112 may use diagnostic information from the first active protection sensor 114*a* and/or the first actuator 116, information provided by another sensor 806, and/or information provided by another ECU 802 to determine whether the first active protection sensor 114*a* can be returned to its non-activated position.

If, at block 1008, the sensor protector 112 determined that the selected active protection sensor cannot be returned to its non-activated position (e.g., due to an electrical issue with the actuator and/or the active protection sensor, due to a change in the path of the active protection sensor from the activated position to the non-activated position, etc.), then, at block 1010, the sensor protector 112 keeps the active protection sensor in the activated position. In some examples, the sensor protector 112 may notify the user of the determination to keep the active protection sensor in the activated position. For example, the sensor protector 112 may display, via the display device 812 of the infotainment head unit 110, a model of the vehicle 100 including the active protection sensor(s) in the activated position. Control then proceeds to block 1016 to determine whether there is another active protection sensor to process (e.g., an unprocessed active protection sensor).

If, at block 1008, the sensor protector 112 determined that the selected active protection sensor can be returned to its non-activated position, then the sensor protector 112 causes the corresponding actuator 116 to move the selected active protection sensor from the activated position to the non-activated position. Control then proceeds to block 1016 to determine whether there is another active protection sensor to process (e.g., an unprocessed active protection sensor).

In some examples, after returning the active protection sensor to the non-activated position (e.g., at block 1012), the sensor protector 112 may request updated position information from the active protection sensor and compare the updated position information to the reference position information to determine whether the active protection sensor moved. For example, while the actuator was able to return the active protection sensor to its non-activated position, the sensor of the active protection sensor may be misaligned with respect to its calibrated (or reference) position. In some such examples, the sensor protector 112 may return the active protection sensor to its activated position. Control may then proceed to block 1010.

If, at block 1016, the sensor protector 112 determined that there is another active protection sensor to process, control returns to block 1004 to determine whether the corresponding actuator was triggered.

If, at block 1016, the sensor protector 112 determined that there is not another active protection sensor to process, the example method 1000 of FIG. 10 ends. In some examples, the example method 1000 of FIG. 10 returns to block 902 of the method 900 of FIG. 9 and the sensor protector 112 continues monitoring the vehicle 100 for an impending collision.

Although the example method 1000 of FIG. 10 illustrates the active protector 112 iteratively processing the active protection sensors 114 of the vehicle 100, it should be appreciated that in additional or alternative embodiments, the active protector 112 may process two or more of the active protection sensors 114 in parallel (e.g., at or substantially near the same time).

The flowcharts of FIGS. 9 and 10 are representative of machine readable instructions stored in memory (such as the memory 810 of FIG. 8) that comprise one or more programs that, when executed by a processor (such as the processor 808 of FIG. 8), cause the vehicle 100 to implement the example sensor protector 112 of FIG. 1 and/or FIG. 8. Further, although the example program(s) is/are described with reference to the flowcharts illustrated in FIGS. 9 and 10, many other methods of implementing the example sensor protector 112 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or." The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. An apparatus comprising:

a housing including a front upper bracket, a front lower bracket, and a groove; and a sensor mounted to the housing and positioned between the front upper bracket and the front lower bracket, wherein the housing and the sensor rotate along the groove of the housing, wherein the housing is mounted to a bracket including a bracket arm, and wherein the bracket arm includes a longitudinal groove.

2. The apparatus of claim 1, wherein the bracket is attached to a structure of a vehicle.

3. The apparatus of claim 1, wherein the housing and the sensor retract from a first position to a second position along the longitudinal groove of the bracket arm.

4. The apparatus of 1, wherein the housing includes a first electrical contact, the sensor includes a second electrical contact, and wherein the first electrical contact and the second electrical contact are aligned.

5. An apparatus comprising:

a housing including a front upper bracket, a front lower bracket, and a groove; and a sensor mounted to the housing and positioned between the front upper bracket and the front lower bracket, wherein the housing and the sensor rotate along the groove of the housing, wherein the housing includes a first electrical contact, wherein the sensor includes a second electrical contact, and wherein the first electrical contact and the second electrical contact are aligned.

* * * * *